US006825260B2

(12) United States Patent
Sievers et al.

(10) Patent No.: US 6,825,260 B2
(45) Date of Patent: Nov. 30, 2004

(54) NANOPOROUS INTERPENETRATING ORGANIC-INORGANIC NETWORKS

(75) Inventors: Werner Sievers, Frankfurt (DE); Andreas Zimmermann, Griesheim (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/730,463

(22) Filed: Dec. 5, 2000

(65) Prior Publication Data

US 2002/0032272 A1 Mar. 14, 2002

Related U.S. Application Data

(63) Continuation of application No. PCT/EP98/03381, filed on Jun. 5, 1998.

(51) Int. Cl.[7] .................................................. C08K 3/34
(52) U.S. Cl. ........................ 524/492; 524/501; 523/334
(58) Field of Search ............................ 521/91; 524/492, 524/501, 912; 523/333, 334; 525/905; 528/10, 25, 41

(56) References Cited

U.S. PATENT DOCUMENTS

| | | | |
|---|---|---|---|
| 2,093,454 A | 9/1937 | Kistler | |
| 2,541,137 A | 2/1951 | Warrick | |
| 2,680,696 A | 6/1954 | Broge | |
| 2,786,042 A | 3/1957 | Iler | |
| 2,886,460 A | 5/1959 | Alexander et al. | |
| 2,978,298 A | 4/1961 | Wetzel | |
| 3,015,645 A | 1/1962 | Tyler | |
| 3,024,126 A | 3/1962 | Brown | |
| 3,122,520 A | 2/1964 | Lentz | |
| 3,615,142 A | 10/1971 | Dahlbom | |
| 3,794,713 A | 2/1974 | Aboutboul | |
| 3,872,217 A | 3/1975 | Merz | |
| 3,920,865 A | 11/1975 | Laufer | |
| 4,101,442 A | 7/1978 | Rosen | |
| 4,101,443 A | 7/1978 | Rosen | |
| 4,190,457 A | 2/1980 | McDaniel | |
| 4,208,316 A | 6/1980 | Nauroth et al. | |
| 4,316,807 A | 2/1982 | McDaniel | |
| 4,344,800 A | 8/1982 | Lutz | |
| 4,382,070 A | 5/1983 | Novak et al. | |
| 4,659,749 A | 4/1987 | Sornik | |
| 4,667,417 A | 5/1987 | Graser | |
| 4,704,374 A | 11/1987 | Jacques | |
| 4,717,708 A | 1/1988 | Cheng et al. | |
| 4,755,294 A | 7/1988 | Pradet | |
| 4,873,218 A | 10/1989 | Pekala | |
| 4,888,309 A | 12/1989 | Araya | |
| 4,888,369 A | 12/1989 | Moore | |
| 4,906,676 A | 3/1990 | Ida | |
| 4,950,502 A | 8/1990 | Saam | |
| 4,950,635 A | 8/1990 | Williams et al. | |
| 4,954,327 A | 9/1990 | Blount | |
| 5,001,183 A | 3/1991 | Sands | |

(List continued on next page.)

FOREIGN PATENT DOCUMENTS

| | | |
|---|---|---|
| CA | 2213511 | 8/1996 |
| CA | 2213569 | 8/1996 |
| CA | 2231428 | 3/1997 |
| DE | 296 898 | 12/1915 |
| DE | 896 189 | 11/1953 |
| DE | 1 667 078 | 5/1971 |
| DE | 3 329 016 | 2/1985 |
| DE | 261 581 | 11/1988 |
| DE | 43 27 923 | 2/1995 |
| EP | 0 031 166 | 7/1981 |
| EP | 0 199 930 | 11/1986 |
| EP | O 298 062 | 1/1989 |
| EP | 0 337 695 | 10/1989 |
| EP | 0 653 377 | 11/1993 |
| EP | 0 659 530 | 6/1995 |
| GB | 607234 | 8/1948 |
| GB | 682574 | 11/1952 |
| GB | 783868 | 1/1955 |
| GB | 919.425 | 2/1963 |
| GB | 2 269 377 | 2/1994 |
| WO | WO 92/20623 | 11/1992 |
| WO | WO 94/22943 | 10/1994 |
| WO | WO 97/10187 | 3/1997 |
| WO | WO 98/05591 | 2/1998 |
| WO | WO 99/64504 | 12/1999 |

OTHER PUBLICATIONS

International Search Report—PCT/EP 98/02519, Sep. 10, 1998.
International Search Report—PCT/EP 97/06595, May 12, 1998.
International Search Report—PCT/EP 98/03161, Oct. 9, 1998.
International Search Report—PCT/EP 98/03381, Feb. 22, 1999.
Internatioanl Search Report—PCT/EP 98/07591, Apr. 19, 1999.
International Search Report—PCT/EP 98/08244, Jul. 5, 1999.
International Search Report—PCT/EP 98/02283.
EPO Search Report TS 68015, Feb. 24, 1998.
Gesser, H.D., Chem.Rev. 1989, 89, 765.
Kistler, S.S., Nature, 1931, 127, 741.
Ullmann's Encyclopedia of Industrial Chemistry, p. 630.
Urbaniak, W., React.Kinet.Catal.Lett. 1987, 34, 129.

Primary Examiner—Katarzyna Wyrozebski

(57) ABSTRACT

Interpenetrating organic and inorganic networks with a maximum dimension of 100 mn are produced by: (1) mixing aqueous solutions or dispersions of organic polymers capable of forming polymer networks in aqueous phase, polymer precursors or the mixtures thereof and silicon dioxide components; (2) changing the pH value and/or thermally treating the aqueous solution or dispersion in order to form a gel made of interpenetrating organic and silica gel networks and (3) drying the gel.

30 Claims, No Drawings

U.S. PATENT DOCUMENTS

| | | | | |
|---|---|---|---|---|
| 5,009,874 A | | 4/1991 | Parmentier | |
| 5,069,815 A | | 12/1991 | Aoki et al. | |
| 5,075,348 A | | 12/1991 | Revis et al. | |
| 5,081,163 A | | 1/1992 | Pekala | |
| 5,086,085 A | * | 2/1992 | Pekala | 521/187 |
| 5,122,291 A | | 6/1992 | Wolff et al. | |
| 5,158,758 A | | 10/1992 | Chieng et al. | |
| 5,194,333 A | | 3/1993 | Ohnaka et al. | |
| 5,215,733 A | | 6/1993 | Potter | |
| 5,275,796 A | | 1/1994 | Tillotson | |
| 5,294,480 A | | 3/1994 | Mielke et al. | |
| 5,409,683 A | | 4/1995 | Tillotson | |
| 5,455,216 A | | 10/1995 | Mueller | |
| 5,456,745 A | | 10/1995 | Roreger et al. | |
| 5,484,818 A | | 1/1996 | De Vos | |
| 5,486,356 A | | 1/1996 | Yim | |
| 5,496,527 A | | 3/1996 | Yokogawa | |
| 5,506,290 A | | 4/1996 | Shapero | |
| 5,508,341 A | | 4/1996 | Mayer | |
| 5,556,892 A | | 9/1996 | Pekala | |
| 5,561,318 A | | 10/1996 | Gnade | |
| 5,565,142 A | | 10/1996 | Deshpande | |
| 5,595,593 A | | 1/1997 | Burns | |
| 5,625,013 A | | 4/1997 | Mueller | |
| 5,651,921 A | | 7/1997 | Kaijou | |
| 5,656,195 A | | 8/1997 | Mielke et al. | |
| 5,674,962 A | | 10/1997 | Ito et al. | |
| 5,680,713 A | | 10/1997 | Forbert et al. | |
| 5,705,535 A | | 1/1998 | Jansen | |
| 5,708,069 A | | 1/1998 | Burns | |
| 5,738,801 A | | 4/1998 | Ziegler et al. | |
| 5,750,610 A | | 5/1998 | Burns | |
| 5,759,506 A | | 6/1998 | Jansen et al. | |
| 5,786,059 A | | 7/1998 | Frank et al. | |
| 5,795,556 A | * | 8/1998 | Jansen et al. | 423/338 |
| 5,811,031 A | | 9/1998 | Jansen et al. | |
| 5,824,622 A | * | 10/1998 | Harmer et al. | 502/407 |
| 5,866,027 A | | 2/1999 | Frank | |
| 5,888,425 A | | 3/1999 | Schwertfeger | |
| 5,948,314 A | * | 9/1999 | Geiss et al. | 252/62 |
| 5,977,241 A | * | 11/1999 | Koloski et al. | 524/502 |
| 6,040,375 A | | 3/2000 | Behme et al. | |
| 6,080,475 A | | 6/2000 | Frank | |
| 6,083,619 A | | 7/2000 | Frank | |
| 6,129,949 A | | 10/2000 | Schwertfeger | |
| 6,140,377 A | | 10/2000 | Schwertgeger | |
| 6,156,386 A | | 12/2000 | Schwertfeger | |
| 6,159,539 A | | 12/2000 | Schwertfeger | |
| 6,160,190 A | * | 12/2000 | Harmer et al. | 585/458 |
| 6,271,292 B1 | * | 8/2001 | Mager et al. | 524/261 |
| 6,602,336 B2 | * | 8/2003 | Risen et al. | 106/31.94 |

* cited by examiner

NANOPOROUS INTERPENETRATING ORGANIC-INORGANIC NETWORKS

This application is a continuation of international application number PCT PCT/EP98/03381 filed 5 Jun. 1998.

The invention pertains to nanoporous, interpenetrating organic-inorganic networks, to processes for their production, and to their use.

Organic polymers are often characterized by ease of molding and elasticity. For many applications, however, they are not hard or scratch-resistant enough. Ceramic materials, in contrast, are hard and scratch-resistant, but they are usually brittle and inelastic. If it is desired to combine the properties of organic polymers with those of inorganic ceramics, the attempt can be made to produce a material consisting of the most uniform possible mixture of the two different components. Various approaches to achieving this goal are known.

U.S. Pat. No. 4,980,396 describes a composition consisting of organopolysiloxane, a filler of the silicate type, an organosilicon compound of the isocyanurate type, and an organic solvent. The composition is used to bond a fluorosilicone rubber permanently to metal, plastic, and other materials; in this case, the fluorosilicate rubber is to be vulcanized by atmospheric, hot-air vulcanization. The constituents are used in the form of a solution or slurry in an organic solvent such as ethyl acetate, for example.

U.S. Pat. No. 5,342,876 describes a process for the production of porous, spherical particles of silicon dioxide. In this process, polyacrylamide polymers are used as a coagulation growth agent to promote the coagulation of the silica gels. Silica gel coagulates with a pore volume of 0.3–1.0 cm$^3$/g are thus obtained. An interpenetrating network of silicon dioxide and polyacrylamide, however, is not formed, which means that the polyacrylamide can be dissolved out of the article produced. The polyacrylamide thus serves to build up the silicon dioxide body but is not a component of an organic-inorganic network.

Various approaches to the problem of obtaining hybrid organic-inorganic materials make use of organosilicon starting compounds. When the very expensive organosilicon compounds are being processed, it is necessary to work in an organic solvent. Both the management of the process and also the starting compounds are extremely expensive, which means that the range of applications open to this process is limited to specialized cases.

Also included among these processes are processes for producing nanocomposite materials, in which alkenylsilanes are polymerized by thermal or photochemical means. After the organic components have been polymerized, an inorganic network is produced by hydrolysis. In this way, bulk materials of high density are accessible. These materials are again extremely expensive.

The task of the present invention is to provide a process for the production of materials with organic and inorganic networks which interpenetrate in very small dimensions, which process makes use of inexpensive starting materials and which leads to products with properties which can be adjusted in many different ways. In particular, the goal is to arrive at aerogels and xerogels of low thermal conductivity and increased sound absorption capacity as well as composite materials which combine the properties of organic polymers with those of inorganic ceramics.

This task is accomplished by a process for the production of materials with interpenetrating organic and inorganic networks with a maximum dimension of 100 nm by:

(1) mixing aqueous solutions or dispersions of organic polymers, polymer precursors, or mixtures thereof which are capable of forming polymer networks in the aqueous phase with silicon dioxide components;

(2) changing the pH of and/or thermally treating the aqueous solution or dispersion to form a gel consisting of interpenetrating organic and silica gel networks; and (3) drying the gel.

It was discovered as part of the invention that the materials listed above can be obtained by processes for the production of aerogels and xerogels, where organic polymers or polymer precursors capable of forming organic networks under the conditions of the formation of aerogels and xerogels are used in addition to the inorganic starting materials for the production of aerogels and xerogels. In the following, the starting materials are described first, and then the different variants of the process are presented.

Organic polymers, polymer precursors, or mixtures thereof which are able to form networks in the aqueous phase are used to form the organic polymer network.

In principle, any organic polymer which is soluble or dispersible in water can be used; a "polymer" is understood here to be a polymer, a polycondensate, or a polyadduct which can be crosslinked in water. Examples are nonionic polyvinyl alcohol, which can be completely or partially saponified from polyvinyl acetate; polyethylene glycol; anionic polymers such as carboxymethylcellulose and sodium poly(meth)acrylate or other poly(meth)acrylates; or cationic polymers, polyamides, or polyvinylamines as well as mixtures of these. Homopolymers and copolymers of sterols such as bile acid homopolymers, copolymers, or oligomers such as those described in EP-A 0,549,967 or cholesterol can be used. In addition to polyvinyl alcohol or poly(meth)acrylate, it is preferred to use organic polymers or their precursors which are based on formaldehyde or on resins which contain formaldehyde. These include primarily melamine resins, phenolic resins, and resorcinol resins. Especially preferred are melamine-formaldehyde resins, which can possibly contain solubilizers such as sulfamate, and which gel preferably in the pH range of 5–6. These polymers should be crosslinkable in an aqueous medium with standard crosslinking agents such as formaldehyde or glutarodialdehyde. In general, aliphatic and aromatic dialdehydes, especially glutarodialdehyde; aliphatic or aromatic diepoxides; or aliphatic and aromatic diisocyanates can also be used as crosslinking agents for the organic component.

The organic polymer network is preferably obtained by polycondensation in the aqueous phase. Polymers and polymer precursors which can be polymerized by radical polymerization in the aqueous phase, however, can also be used.

Melamine-formaldehyde condensates are described in, for example, U.S. Pat. No. 5,086,085. Resorcinol-formaldehyde condensates are described in, for example, U.S. Pat. No. 4,873,216.

It is preferred to select organic polymers, polymer precursors, or their mixtures which polycondense by adjustment of the pH value or the temperature to a value in the same range as that in which the inorganic (silicate) network condenses.

If polyacrylic acids or bile acid homo- or copolymers according to EP-A 0,549,967 or possibly other derivatives of polyacrylic acids or of polyacrylic acid amide are used, then advantage can also be taken of their enormous swelling capacity, which means that the polyacrylic acids can be used in a form in which they have already been crosslinked and dried. They can be added to a silicic acid sol to swell them. The expression "organic polymers, polymer precursors, or mixtures thereof" thus designates all the components which are required to obtain a polymer network in an aqueous solution or dispersion. In particular, this expression includes polymers, prepolymers, monomers, crosslinking agents, and other substances which play a role in polymerization or crosslinking.

The silicon dioxide components used according to the invention are components which can form polymeric networks in an aqueous solution. The preferred silicon dioxide components are water glass, laminar silicates, or silicic acids. Metal oxides which are suitable for the sol-gel technique are described in, for example, C. J. Brinker and G. W. Scherer: *Sol-Gel Science,* 1990, Chapters 2 and 3, Academic Press, Inc., New York. Free silicic acid is the preferred component, which can be produced from water glass, for example, by separation of the cations by the use of ion-exchangers. A process of this type is described in, for example, EP-A 0,658,513. Free silicic acid from which the cations have been removed is highly compatible with organic polymers, polymer precursors, or mixtures thereof which can form polymer networks and can form stable sols and gels under a wide variety of conditions as a function of the pH value and concentration. In general, usable silicic acids are built up from sodium or potassium oxide and silicon dioxide. Colloidal silicic acids can also be used.

Especially preferred for use in the process according to the invention is a combination of water glass or preferably free silicic acid and melamine resins, especially standard commercial sulfamate-modified melamine resins.

Additional constituents which can be used include the components which are normally used to prepare polymers or silica gels and which are compatible with the aqueous phase. Fillers in the form of particles, fibers, fabrics, nonwovens, mats, or mixtures thereof and functional substances such as dyes, indicators, biomolecules, e.g., as aqueous or nonaqueous solutions, dispersions, or suspensions, or mixtures thereof are preferably used. Biomolecules which can be used include, for example, proteins such as enzymes, transport proteins, receptors, or antibodies. These fillers or functional substances can influence in a controlled manner the electric, dielectric, optical, mechanical, rheological, sensory, permeative, or diffusive properties of the materials obtained.

Especially during the production of thermal insulation materials, IR-opacifiers are added as fillers. These components serve to reduce the degree to which radiation contributes to the thermal conductivity. Suitable IR opacifiers include, for example, carbon black, titanium dioxide, iron oxide, zirconium oxide, and mixtures of these compounds. They can be added to the aqueous solution or dispersion or to the sol.

Fillers can also be added to improve the mechanical strength of the molded articles or materials obtained. In particular, fibers in the form of nonwovens or mats, for example, can be added. The fibrous material used can consist either of inorganic fibers such as glass fibers or mineral fibers or of organic fibers such as polyester fibers, polyamide fibers, or Nylon fibers. The fibers can also be coated; for example, polyester fibers which have been metallized with a metal such as aluminum can be used. When the goal is to reduce the contribution made by radiation to the thermal conductivity of the resulting material, furthermore, blackened fibers can be used, such as PET fibers blackened with carbon black.

The fire classification of the material obtained after drying is determined by the fire classification of the aerogel, of the organic component, and of the fibrous material. To obtain a material with the best possible fire classification (fire-resistant or incombustible), preferably fibers of an incombustible material such as mineral or glass fibers are used. Examples of fire-resistant fibers are melamine resin fibers and fire-resistant polyester fibers.

To prevent the added fibers from increasing the thermal conductivity of materials which are to be used for thermal insulation, the volume fraction of the fibers should be in the range of 0.1–30 wt. %, preferably in the range of 1–10 wt. %, based on dried material. In addition, the thermal conductivity of the fibrous material should be as low as possible, preferably less than 1 W/mK.

The extent to which radiation contributes to thermal conductivity can be reduced and greater mechanical strength can be achieved by choosing fibers of suitable diameter and/or material. In this sense, the fiber diameter should preferably be in the range of 0.1–30 $\mu$m in the case of nonmetallized fibers and/or in the range of 0.1–20 $\mu$m in the case of metallized fibers.

The mechanical strength of the material obtained after drying is also affected by the length and distribution of the fibers in the aqueous solution or dispersion. The fibers can be, for example, introduced as individual fibers in a random orientation or with an orientation. In this case, they should have a length of at least 1 cm, preferably at least 2 cm, to guarantee sufficient strength of the composite material.

Nonwovens or mats which have been saturated with the solution or dispersion can also be used; several layers of nonwovens or mats can be stacked on top of one another. When mats with a defined fiber orientation are stacked, it is advantageous for the preferred direction to vary from one layer to the next.

Additional constituents are:
  dyes in typical concentrations to determine the color of the material according to the invention. In principle, any type of dye, either in solution or in dispersion, can be used;
  stabilizers such as UV-stabilizers and hygroscopic components such as polyacrylic acids; also amines such as polyvinylamines and immobilized silylamines, which influence the swelling effect and the adsorption behavior of the material;
  flame inhibitors such as those typically used as additives for the selected polymers, e.g., phosphates and bromine compounds, and IR-absorbers;
  indicators, e.g., pH indicators, and biomolecules, e.g., proteins such as enzymes, transport proteins, receptors, or antibodies such as fluorescently labeled antibodies and dyes, which change the optical behavior (absorption, reflection, fluorescence quenching) in the presence of substances to be detected.

The constituents can be held in the composite by covalent bonding, by inclusion in voids of the proper size, or even by hydrogen bridge bonds. It is also possible to use special immobilization methods such as those known from dye technology and biotechnology. The important point, however, is that they should not be released while the material is being used for its intended purpose. The constituents can be introduced before, during, and/or after the drying process, preferably before a subsequent recondensation of the organic network. It is also possible to prepare a granulate of the material first, to grind it, and then to mix it with one or more of the fillers and functional substances listed above.

In the solution or dispersion used to produce the materials according to the invention, the ratio by weight of the silicon dioxide component to the organic polymers and/or polymer precursors is preferably 10–98, more preferably 20–90, especially 30–80. When the goal is to produce aerogels or xerogels, the ratio is preferably 10–98, more preferably 20–90. For the production of composite materials, the ratio is preferably 20–90, especially 30–80.

The aqueous solution used in the process according to the invention contains preferably 3–70 wt. %, more preferably 5–50 wt. %, and especially 5–35 wt. % of constituents, based on the total amount of the aqueous solution or dispersion. The polymers and/or polymer precursors are present preferably in an amount in the range of 1–50 wt. %, more preferably 1–30 wt. %. The silicon dioxide components preferably account for 1–30 wt. %, more preferably 1–25 wt. %, of the total.

The aqueous solution or dispersion for forming polymer networks can be produced by any suitable process. For example, separate aqueous solutions or dispersions of the organic and inorganic materials can be prepared and then mixed together. All of the materials can also be dissolved or dispersed successively in water. The pH of the solution thus obtained is preferably adjusted in such a way that there is enough time to mix the components thoroughly together before a gel starts to form from the sol.

Water is preferably used as the aqueous phase. It is also possible, however, to use a mixture of water and organic solvents such as alcohols, polyols, cyclic ethers, etc. In the latter case, the organic solvents, if used, account preferably for 0.1–10 wt. %, even more preferably for 0.1–5 wt. %, of the total. As a rule, work is carried out in water as the aqueous phase.

The aqueous phase, which can be a sol, containing the organic and inorganic starting substances, is converted in the second step to a gel of interpenetrating organic and silica gel networks by changing the pH value of the aqueous solution or dispersion and/or by subjecting it to a thermal treatment. By appropriate adjustment of the pH, the silicate network (silica gel) can be induced to form before the organic network is formed. But it is also possible for the silicate network and the organic network to form in parallel with each other or for the organic network to form first. The time it takes for the gel to form and for the two networks to develop can be controlled via the control of the pH, i.e., by the addition of a base or an acid. The growth of the networks also depends on whether crosslinking agents are used for the organic network. The pH is preferably adjusted to a value of 3–7 for gel formation.

A solid gel can also be obtained by increasing the temperature to a point below the boiling point of water. The temperature can be even be increased to a point above the boiling point of water as long as a pressurized apparatus is used to prevent the water from boiling. A solid gel can be obtained within a period ranging from a few seconds to a few hours, the exact time depending on the temperature. Work is preferably carried out at a temperature of 10–90° C., even more preferably at 30–85° C., at which the time it takes for the gel to form is preferably in the range between 0.1 second and 2 hours.

The gel thus obtained can be hardened and aged at elevated pressure in the range of 1–30 bars, preferably of 1–12 bars, at a temperature of 10–200° C., preferably of 5–150° C., and especially at 50–150° C. The pressure is selected so that the water is prevented from boiling.

It is also possible to change the pH and to increase the temperature simultaneously.

It is especially preferred to produce the gel by adjusting the pH to a value in the range of 3–8, especially in the range of 5–6, and by increasing the temperature to a value of 0–85° C. at ambient pressure.

An interpenetrating network of silicate and organic networks is present in the gel. It is also possible for the silicate network and the organic network to be bonded to each other by, for example, covalent bonds, hydrogen bridge bonds, or ionic bonds.

The organic and inorganic (silicate) networks interpenetrate in dimensions of no more than 100 nm, preferably of no more than 50 nm, even more preferably of no more than 30 nm, and especially of no more than 15 nm. The term "dimensions" means that, in at least 50 wt. %, preferably in 70 wt. %, and especially in 80 wt. % of the networks, the boundary of the corresponding organic or inorganic phase is reached at a distance of no more than 100 nm, preferably of no more than 50 nm, even more preferably of no more than 30 nm, and especially of no more than 15 nm from any point of the network. If we assume a model of interpenetrating tubes, then this number gives the maximum diameter of the tubes in each network. Because the networks rest against each other to at least some extent and can also be bonded to each other, a phase boundary between the organic network phase the inorganic network phase is reached in most cases at this distance. We can thus also speak of a mixture of organic and inorganic phases on a nanometer scale.

In contrast to the interpenetrating networks according to the invention, most of the known mixtures of organic and inorganic materials are present in much larger dimensions.

After a gel of interpenetrating organic and silica gel networks has been formed, the gel is dried. Drying can be accomplished in any desired way; different drying methods will lead to different types of materials. According to one embodiment of the invention, drying is carried out under conditions which lead to a xerogel or an aerogel. The selected method of drying, i.e., the method by which the solvent or dispersant present in the gel is removed, determines whether an aerogel or a xerogel is obtained. A dried gel is called an "aerogel" when the solvent or dispersant of the gel is removed at temperatures above the critical temperature and at pressures starting from a point above the critical pressure. As a result, the boundary between the liquid phase and the vapor phase is not crossed, and therefore no capillary forces are developed, which would otherwise lead to the collapse of the gel during the drying process. If, however, the solvent or dispersant is removed under conditions such that a liquid-vapor phase boundary is formed, the resulting gel is called a "xerogel". The 3-dimensional arrangement of the network is altered as a result; that is, the distances between the structural elements become much smaller. Processes for drying gels to form xerogels are described in, for example, *Annu. Rev. Mater. Sci.*, Vol. 20, p. 269 ff., 1990, and L. L. Hench and W. Vasconcelos: *Gel-Silica Science*. Drying processes for producing aerogels are described in, for example, S. S. Kistler: *J. Phys. Chem.*, Vol. 36, 1932.

The aerogels/xerogels produced according to the invention preferably have a density of no more than 0.6 g/cm$^3$, even more preferably of no more than 0.3 g/cm$^3$. They preferably have a thermal conductivity of no more than 0.06 W/mK, even more preferably of no more than 0.04 W/mK. Especially when the relative weight fraction of the inorganic network is in the range of 1–50 wt. %, preferably in the range of 1–10 wt. %, based on the total weight of the aerogel, it is possible to produce aerogels with a density of less than 0.27 g/cm$^3$.

The aerogels according to the invention have greater mechanical strength than other, known inorganic aerogels.

As a result of their low thermal conductivity, the aerogels can be used as thermal insulation materials; and, as a result of their high sound absorption capacity, they can be used as soundproofing materials. For this purpose, the aerogels can be fabricated into any desired type of shaped article, or they can be applied as a surface coating. The aerogels can be used directly, in the highest possible volume concentration, either as molded aerogel bodies such as plates, rolls, sheets, or beads or as bulk granulate. The molded articles can be produced before the gel is formed by introducing the aqueous solution or dispersion into a mold or by applying it to a surface and then by forming the gel and drying it.

It is also possible to use the aerogels according to the state of the art as a component of standard fabrication methods. For example, they can be used as a thermally insulating additive to foams according to EP-A 0,667,370; in hydrophobed form in aqueous suspensions according to DE-A 4,437,424; or as a filler in the processing of ceramics, as described in WO 96/15,997 and WO 96/15,998. In conjunction with extrusion techniques, it is especially advantageous that the mechanical strength of the aerogels under pressure (modulus of elasticity) is much higher than that of aerogels of comparable density produced without an organic component. Surfaces can be coated quite easily thanks to the adhesive properties of the solutions or dispersions. Suitable coating methods include, for example, spraying, spreading with a blade, and brushing. After the applied coating has dried, firmly adhering, thermally insulating, sound-absorbing surface coatings are obtained. Because they have a low sound velocity and because their sound absorption capacity is greater than that of monolithic aerogels, the materials can be used as sound absorbers, either directly or in the form of resonance absorbers.

Because of their large internal surface area, the aerogels are also useful as adsorbents. They typically have pore sizes in the range of 5–100, preferably of 5–20. They can therefore be used as adsorbents for a wide variety of substances, especially since the target substance can be adsorbed either on the organic polymer used or on the silica gel. Because the pores are continuous, the aerogels can also be used as filter materials.

In addition, they also have barrier properties versus water and/or organic solvents.

They can also be used as filler material for chromatographic separation columns intended for chiral selection and/or the separation of enantiomers. They are also suitable as a base material for membranes.

They can also be used, furthermore, in the electronics area for the production of, for example, integrated circuits (ICs).

They can, furthermore, be loaded with compounds which make it possible for them to be used as sensors. For example, functional units such as pH indicators or moisture indicators can be held within the aerogel. Thus the aerogels according to the invention can be useful in a large variety of sensor applications.

In conjunction with dyes, indicators, and/or biomolecules such as proteins, e.g., enzymes, transport proteins, receptors, or antibodies, the aerogels can thus also be useful in the areas of medical diagnosis and sensor technology.

They can also be used for retarding the release of active ingredients. For this purpose, they are first loaded with the active compounds, which are bound reversibly to the networks. This bonding can be accomplished, for example, with the help of the silicate structures or possibly via amino groups present in the organic network. Thus, for example, active ingredients such as cholesterol and other active pharmaceutical ingredients can be released at a slowed rate. Advantage can be taken here of the specific bonding of certain compounds to the aerogel. The bonding behavior can also be modified by changing the pH, for example.

The aerogels according to the invention are more flexible and elastic than aerogels not modified with organic polymer networks. They are therefore to be especially preferred in cases where mechanical loads are involved, since they show significant advantages in this respect over brittle, purely inorganic aerogels.

Through the appropriate selection of suitable organic polymers, the aerogels can be made biocompatible, so that it also becomes possible to bond biomolecules such as proteins, e.g., enzymes, transport proteins, receptors, or antibodies, to them.

In the form of xerogels, the materials according to the invention can be used for appropriate applications where a pore volume less than that of an aerogel is desired. For these uses, reference can be made to the previous description of the aerogels.

The gels can also be dried under conditions which lead to a composite material. This composite can then be calcined. To produce composite materials, the gels are dewatered in such a way that the network structures collapse and a compact, solid body is obtained, which has only a small number or pores or no pores at all. These solid bodies typically have a density of 0.8–1.2 $g/cm^3$. The composite materials thus obtained can be brought into any desired shape, as described above, or applied as a surface coating. Their properties differ considerably from those of organic polymers and inorganic ceramics. In addition, the materials are usually translucent. Especially in conjunction with appropriate fillers such as those described above, materials with highly advantageous properties, especially with respect to elasticity and mechanical strength, are obtained. The materials are scratch-resistant; they heatstable; and they are much less crumbly and brittle than silicate materials. The organic networks can be fused or hardened even more by heating them, especially by calcining them, preferably at temperatures of 80–200° C., even more preferably of 90–150° C., and most preferably of 90–130° C. When condensable organic polymers are used, further condensation can occur. Thus, these nonporous materials can be used in the form of granulates for the production of molded articles; the granulate is preferably press-molded under heat. Such granulates can also be molded by extrusion, for example, provided that the organic network constitutes a sufficient percentage of the whole. When bulk material is used, it is possible to arrive according to the invention at so-called "nanocomposites", which are much less expensive than the previously known nanocomposites. Thus granulates or molded ceramic articles can be produced from the composite materials. These composite materials are also suitable as surface coatings. For example, they can be used to obtain flexible and scratch-resistant surfaces.

According to the invention, the inorganic networks can be chemically modified. For this purpose, a solvent exchange with an organic solvent can be brought about in the gel, as described in, for example, EP-A 0,658,513. As a result, for example, methoxy groups can be added by supercritical drying in methanol, or, more generally, alkoxy groups can be added by drying in alkanols. This process is limited to the covalent addition of hydrophobic groups.

An organic modification of the gels according to the invention, in which the extent of the organic involvement can be freely chosen, is described in, for example, WO 97/10,178. Here, for example, components for hydrophobic surface modification can be introduced into the solvent, whereupon drying is performed under either supercritical or subcritical conditions. It is also possible to conduct several solvent exchanges with different organic solvents in succession. If additional substances are used for hydrophobing, then any excess reaction solution can be removed before the following drying by washing with pure solvent. In general, aliphatic alcohols, ethers, esters, or ketones as well as aliphatic or aromatic hydrocarbons are suitable as organic solvents. It is also possible to use mixtures of these solvents mentioned. The preferred solvents are methanol, acetone, tetrahydrofuran, acetic acid ethyl ester, dioxane, n-hexane, n-heptane, and toluene. The solvent which is especially preferred is acetone.

The preferred goal of the surface modification is to introduce covalently bonded hydrophobic surface groups, which are resistant to hydrolysis during use. Suitable groups are trialkylsilyl groups of the general formula —Si($R_3$), where the R's, which can be the same or different, stand for a nonreactive organic radical such as a $C_{1-18}$-alkyl, preferably a $C_1$–$C_6$-alkyl, and most preferably for methyl or ethyl, cyclohexyl, or even phenyl. It is also possible to use $C_{2-16}$-alkenyl, and preferably $C_{2-6}$-alkenyl radicals. It is especially advantageous to use trimethylsilyl groups to make the material, especially the aerogel, permanently hydrophobic.

These groups can be introduced as described in WO 94/25,149. A gas-phase reaction is conducted between the aerogel and an activated derivative of a trialkylsilane such as a chlorotrialkylsilane or a hexaalkyldisilazane; see also R. Iler: *The Chemistry of Silica*, Wiley and Sons, 1979. It is also possible to react an acetone-containing gel with trimethyl-isopropenoxysilane; see DE-C 195-02,453. The introduction of hydrophobic surface groups is not a necessary condition for the production of low-density aerogels according to the invention; on the contrary, it makes possible an expansion of the application spectrum with respect to systems which are insensitive to water.

Drying is usually conducted after the modification and is continued until the residual solvent content is less than 0.1 wt. %. Examples of suitable drying processes include contact drying and convection drying as well as electric drying processes.

The invention is explained in greater detail below on the basis of examples.

The thermal conductivity of the aerogels produced according to the invention was measured by the heating wire method; see for example, O. Nielsson, G. Rüschenpöhler, J. Groβ, and J. Fricke: *High Temperatures—High Pressures*, Vol. 21, pp. 267–275, 1989, Academic Press Inc., New York.

The modulus was measured by the three-point bending method; see, for example, G. W. Scherer, S. A. Pardenek, and R. M. Swiatek: *J. Non-Crystalline Solids*, Vol. 107, pp. 14–22, 1988, Academic Press Inc., New York.

EXAMPLE 1

Free silicic acid was produced from a 7 wt. % sodium silicate solution by the use of an acid ion-exchanger and then adjusted to a pH of 5.7 with dilute 0.1 N sodium hydroxide. 100 mL of this solution was then mixed with 10 mL of a solution of a standard commercial sulfamate-modified melamine resin, i.e., Madurit® MW 114 from Cassella AG, which had bee diluted to 10 wt. %, and the pH of which had also been adjusted to 5.7 with 0.1 N hydrochloric acid. Thus a sol was formed, which was poured into 6-mm thick tubes. After the sol had been allowed to gel for 6 hours at 85° C., the tubes were cooled and the gel was removed from the tubes. The water present in the pores of the gel was exchanged with acetone until the concentration of the water in the acetone was less than 1 wt. %. The gel thus obtained was dried in a stream of nitrogen heated to 150° C. and conducted at a rate of 1,000 L/h. The solid density of the dried gel was 0.28 g/cm$^3$, and its thermal conductivity at room temperature was 47 mW/mK.

EXAMPLE 2

Free silicic acid was produced from a 7 wt. % sodium silicate solution by the use of an acid ion-exchanger and adjusted to a pH of 5.7 with dilute 0.1 N sodium hydroxide. 100 mL of this solution was then mixed with 5 mL of a solution of a standard commercial sulfate-modified melamine resin, i.e., Madurit® W114 from Cassella AG, which had been diluted to 10 wt. % and the pH of which had also been adjusted to 5.7 with 0.1 N hydrochloric acid. The sol thus formed was then poured into 6-mm-thick tubes. After the sol had been allowed to gel for 6 hours at 85° C., the tubes were cooled and the gel was removed from the tubes. The water present in the pores of the gel was exchanged with acetone until the concentration of water in the acetone was less than 1 wt. %. The gel thus obtained was dried in a 2,000 L/h stream of nitrogen, which had been heated to 150° C. The solid density of the dried gel was 0.22 g/cm$^3$, and its thermal conductivity at room temperature was 34 mW/mK.

EXAMPLE 3

Free silicic acid was produced from a 7 wt. % sodium silicate solution by the use of an acid ion-exchanger and adjusted to a pH of 5.7 with dilute 0.1 N sodium hydroxide. 100 mL of this solution was then mixed with 6 mL of a solution of a standard commercial sulfate-modified melamine resin, i.e., Madurit® MW114 from Cassella AG, which had been diluted to 10 wt. % and the pH of which had also been adjusted to 5.7 with 0.1 N hydrochloric acid. A sol was thus formed. In addition, 1 wt. % (based on the solids content of the sol) of standard commercial acetylene carbon black was incorporated into the sol by the use of an Ultraturrax. The mixture was poured in 6-mm-thick tubes. After the sol had been allowed to gel for 6 hours at 85° C., the tubes were cooled and the gel was removed from the tubes. The water present in the pores of the gel was exchanged with isopropanol until the concentration of water in the isopropanol was less than 1 wt. %. The gel thus obtained was dried in a 1,000 L/h stream of nitrogen, which had been heated to 150° C. The solid density of the dried gel was 0.28 g/cm$^8$, and its thermal conductivity at room temperature was 50 mW/mK.

What is claimed is:

1. Process for the production of materials with interpenetrating organic and inorganic networks on a scale of no more than 100 nm by:

(1) mixing aqueous solutions or dispersions of organic polymers, polymer precursors, or mixtures thereof which are capable of forming polymer networks in the aqueous phase with silicon dioxide compounds;

(2) changing the pH of and/or thermally treating the aqueous solution or dispersion to form a gel consisting of interpenetrating organic and silica gel networks; and (3) drying the gel to produce a material with interpenetrating organic and inorganic networks a scale of no more than 100 nm.

2. Process according to claim 1, characterized in that the organic polymers, polymer precursors, or mixtures thereof are based on formaldehyde or formaldehyde-containing resins, polyvinyl alcohol, or poly(meth)acrylates.

3. The process according to claim 1, characterized in that sodium silicate, laminar silicates or silicic acids are used as the silicon dioxide compounds.

4. Process according to claim 1, characterized in that fillers in the form of particles, fibers, fabrics, nonwovens, mats, or mixtures thereof or functional substances such as dyes, indicators, biomolecules, receptors or mixtures thereof are added to the aqueous solution.

5. Process for the production of materials with interpenetrating organic and inorganic networks on a scale of no more than 100 nm by
(1) mixing aqueous solutions or dispersions of organic polymers, polymer precursors, or mixtures thereof which are capable of forming polymer networks in the aqueous phase with silicon dioxide compounds;
(2) changing the pH of and/or thermally treating the aqueous solution or dispersion to form a gel consisting of interpenetrating organic and silica gel networks; and
(3) drying the gel,
characterized in that the water in the materials is replaced by an organic solvent before drying, and in that the silica gels are modified organically by silylation.

6. Process for the production of materials with interpenetrating organic and inorganic networks on a scale of no more than 100 nm by
(1) mixing aqueous solutions or dispersions of organic polymers, polymer precursors, or mixtures thereof which are capable of forming polymer networks in the aqueous phase with silicon dioxide compounds;
(2) changing the pH of and/or thermally treating the aqueous solution or dispersion to form a gel consisting of interpenetrating organic and silica gel networks; and
(3) drying the gel,
characterized in that drying is conducted under conditions which lead to a composite material, where the composite material can then be calcined.

7. Process according to claim 1, characterized in that drying is conducted under conditions which lead to a xerogel or to an aerogel.

8. Materials with organic and inorganic networks which interpenetrate on a scale of no more than 100 nm and are obtained by a process according to claim 1.

9. Molded article consisting of material according to claim 8.

10. Process for the production of molded articles according to claim 9, characterized in that the aqueous solutions or dispersions are introduced into a mold and in that a gel is then formed and dried.

11. Surface coating consisting of material according to claim 8.

12. Process for the production of surface coatings according to claim 9, characterized in that the aqueous solutions or dispersions are applied to a surface and in that a gel is then formed and dried.

13. Aerogel consisting of organic and inorganic networks interpenetrating on a scale of no more than 100 nm with a density of on more then 0.6 g/cm$^3$.

14. Molded article consisting of material according to claim 13.

15. Process for the production of molded articles according to claim 14, characterized in that the aqueous solutions or dispersions are introduced into a mold and in that a gel is then formed and dried.

16. Surface coating consisting of material according to claim 13.

17. A process of producing materials, the process comprising:
(a) providing organic and inorganic networks which interpenetrate on a scale of no more than 100 nm, the organic and inorganic networks which interpenetrate on a scale of no more than 100 nm produced by a method comprising:
(1) mixing aqueous solutions or dispersions of organic polymers, polymer precursors, or mixtures thereof which are capable of forming polymer networks in the aqueous phase with silicon dioxide compounds,
(2) changing the pH of and/or thermally treating the aqueous solution or dispersion to form a gel consisting of interpenetrating organic and silica gel networks, and
(3) drying the gel;
(b) producing materials using the gel, the materials comprising thermal insulation properties, sound absorption properties, adsorption properties and/or barrier properties against water and/or organic solvent.

18. The process of claim 17 in which the gel is dried under conditions which lead to a composite material.

19. The process of claim 17 in which the gel is dried under conditions which lead to a xerogel or an aerogel.

20. The process of claim 19, in which the produced materials comprise molded articles.

21. The process of claim 19 in which the produced materials comprise surface coatings.

22. Process for the production of surface coatings according to claim 16, characterized in that the aqueous solutions or dispersions are applied to a surface and in that a gel is then formed and dried.

23. A process of producing materials, the process comprising:
(a) providing organic and inorganic networks which interpenetrate on a scale of no more than 100 nm, the organic and inorganic networks which interpenetrate on a scale of no more than 100 nm produced by a method comprising:
(1) mixing aqueous solutions or dispersions of organic polymers, polymer precursors, or mixtures thereof which are capable of forming polymer networks in the aqueous phase with silicon dioxide compounds,
(2) changing the pH of and/or thermally treating the aqueous solution or dispersion to form a gel consisting of interpenetrating organic and silica gel networks, and
(3) drying the gel;
(b) producing materials using the gel, the materials comprising thermal insulation properties, sound absorption properties, adsorption properties and/or barrier properties against water and/or organic solvent,
in which the gel is dried under conditions which lead to a composite material and in which the produced materials are granulates or molded ceramic articles.

24. A process of using materials for medical diagnostics and sensor technology, the process comprising:
(a) providing organic and inorganic networks which interpenetrate on a scale of no more than 100 nm, the organic and inorganic networks which interpenetrate on a scale of no more than 100 nm produced by a method comprising:
(1) mixing aqueous solutions or dispersions of organic polymers, polymer precursors, or mixtures thereof which are capable of forming polymer networks in the aqueous phase with silicon dioxide compounds,
(2) changing the pH of and/or thermally treating the aqueous solution or dispersion to form a gel consisting of interpenetrating organic and silica gel networks, and
(3) drying the gel;
(b) producing materials comprising the gel in conjunction with dyes, indicators, receptors, enzymes and/or biomolecules; and (c) using the materials for medical diagnostics and sensor technology.

25. The process of claim 24 in which the materials have a density of no more than 0.6 g/cm$^3$.

26. The process of claim 24 in which the materials comprise a molded article or surface coating.

27. The process of claim 26 in which the materials have a density of no more than 0.6 g/cm$^3$.

28. Process for the production of materials with interpenetrating organic and inorganic networks on a scale of no more than 100 nm by:
   (1) mixing aqueous solutions or dispersions of organic polymers, polymer precursors, or mixtures thereof which are capable of forming polymer networks in the aqueous phase with silicon dioxide compounds, wherein the organic polymers, polymer precursors, or mixtures thereof are formaldehyde or formaldehyde-containing resins, polyvinyl alcohol, or poly(meth) acrylates;
      (2) changing the pH of the aqueous solution or dispersion to form a gel consisting of interpenetrating organic and silica gel networks; and
   (3) drying the gel.

29. Process for the production of materials with interpenetrating organic and inorganic networks on a scale of no more than 100 nm by:
   (1) mixing aqueous solutions or dispersions of organic polymers, polymer precursors, or mixtures thereof which are capable of forming polymer networks in the aqueous phase with silicon dioxide compounds, wherein the organic polymers, polymer precursors, or mixtures thereof are formaldehyde or formaldehyde-containing resins, polyvinyl alcohol, or poly(meth) acrylates;
   (2) thermally treating the aqueous solution or dispersion to form a gel consisting of interpenetrating organic and silica gel networks; and
   (3) drying the gel.

30. Process for the production of materials with interpenetrating organic and inorganic networks on a scale of no more than 100 nm by:
   (1) mixing aqueous solutions or dispersions of organic polymers, polymer precursors, or mixtures thereof which are capable of forming polymer networks in the aqueous phase with silicon dioxide compounds, wherein the organic polymers, polymer precursors or mixtures thereof are selected from the group consisting of polyethylene glycol, carboxymethylcellulose, polyamides, polyvinylamines, bile acid homopolymers, bile acid copolymers, bile acid oligomers, melamine resins, phenolic resins, resorcinol resins, melamine-formaldehyde resins, resorcinol-formaldehyde condensates and polyacrylic acids;
   (2) changing the pH of and/or thermally treating the aqueous solution or dispersion to form a gel consisting of interpenetrating organic and silica gel networks; and
   (3) drying the gel.

* * * * *